United States Patent

Huang

Patent Number: 5,372,023
Date of Patent: Dec. 13, 1994

[54] GEAR SHIFT LEVER LOCK

[76] Inventor: Chuan-Lung Huang, 3 Fl., No. 638, Chung Chen Rd., Yeong Ho City, Taipei Hsien, Taiwan, Prov. of China

[21] Appl. No.: 106,622

[22] Filed: Aug. 16, 1993

[51] Int. Cl.⁵ ............................................ B60R 25/06
[52] U.S. Cl. ........................................ 70/247; 70/238; 180/287
[58] Field of Search ............... 180/287; 70/201, 202, 70/237, 238, 466, 163, 164, 181, 183, 158, 245, 248, 53, 30, 49

[56] References Cited

U.S. PATENT DOCUMENTS

| | | | |
|---|---|---|---|
| 564,498 | 7/1896 | Bagot | 70/53 |
| 1,258,630 | 5/1918 | Cornall | 70/202 |
| 1,641,992 | 9/1927 | Reason | 70/247 |
| 2,293,197 | 8/1942 | Dorr . | |
| 4,791,795 | 12/1988 | Burgess et al. | 70/247 |
| 4,825,670 | 5/1989 | Snow | 70/247 |

FOREIGN PATENT DOCUMENTS

| | | | |
|---|---|---|---|
| 611262 | 3/1935 | Germany | 70/238 |
| 482437 | 6/1953 | Italy | 70/202 |
| 2161771 | 1/1986 | United Kingdom | 70/248 |
| 2197630 | 5/1988 | United Kingdom . | |

Primary Examiner—Peter M. Cuomo
Assistant Examiner—Darnell M. Boucher
Attorney, Agent, or Firm—Varndell Legal Group

[57] ABSTRACT

A gear shift lever lock consisted of a mounting plate fixed to the console box at one side, two headed lock bolts, a lock body fastened to the mounting plate and locked by the headed lock bolt to constrain the gear shift lever, wherein the lock body surrounds the gear shift lever to protect it against damage as the gear shift lever is constrained within a front opening thereof; one headed lock bolt is connected with a steel rope terminated to a retainer ring for constraining the steering wheel; the mounting plate has a dovetail groove correspondent to a dovetail tongue on the lock body for mounting the lock body through a dovetail joint as the lock is not in use.

2 Claims, 7 Drawing Sheets

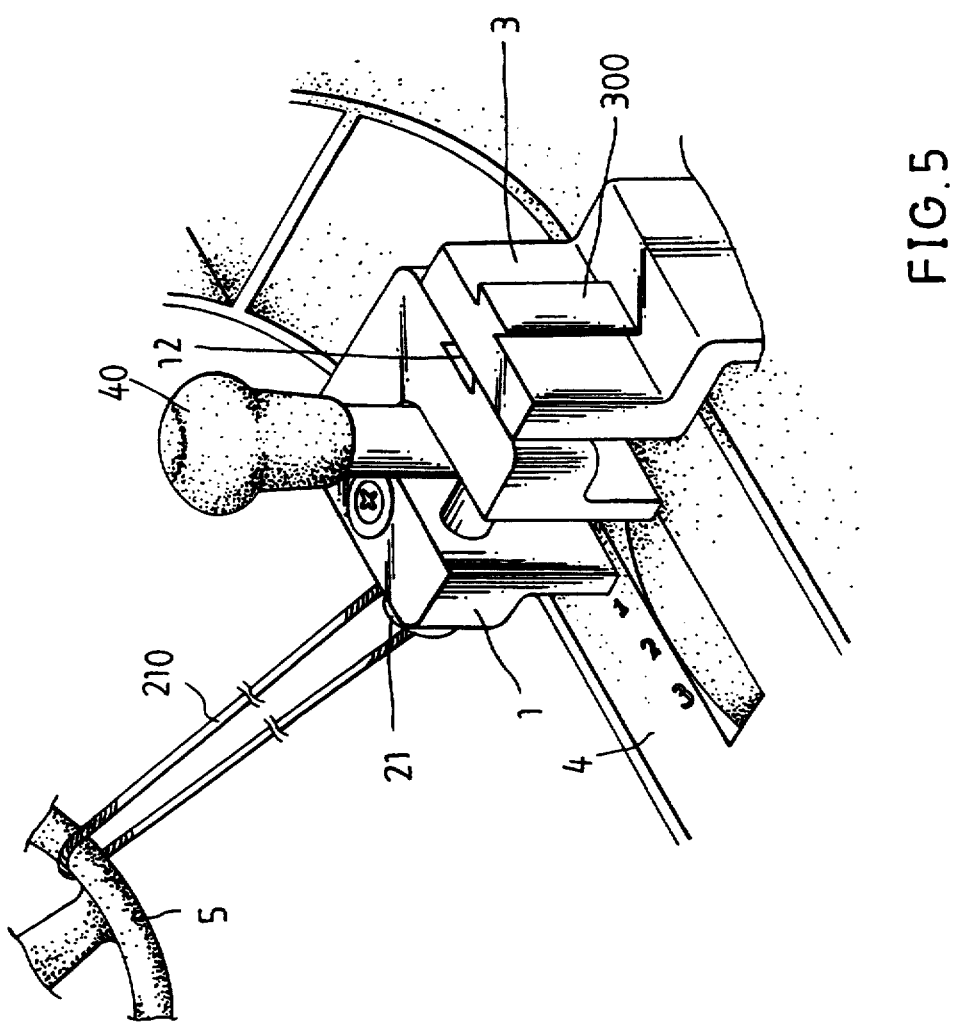

GEAR SHIFT LEVER LOCK

BACKGROUND OF THE INVENTION

The present invention relates to steering locks, and more specifically relates to a gear shift lever lock for locking the gear shift lever of a car.

Gear shift lever lock is one of the most popular steering locks for automobiles at present. A prior art gear shift lock, as shown in FIG. 1, is generally comprised of a lock body fastened to the console box, and a shackle fastened to the lock body to lock the gear shift lever in position. This structure of gear shift lever lock can effectively lock the gear shift lever in position, however it is still not satisfactory in use because of the following drawbacks:

1. As the lock is unlocked, the shackle must be kept properly, or it will fall or slide around as the car is vibrated while passing over an uneven road surface or making a sudden turning.
2. As the lock body is fixed to the console box, it always stands in the way, causing the shifting of the gear shift lever difficult.
3. The lower part of the gear shift lever is not protected by the shackle, and can be easily cut off by the thief with a shearing tool to release from the shackle of the lock.

SUMMARY OF THE INVENTION

The present invention eliminates the aforesaid drawbacks. It is therefore the principal object of the present invention to provide a gear shift lever lock which effectively locks the gear shift lever in position and simultaneously protects the gear shift lever against damage. It is another object of the present invention to provide a gear shift lever lock which simultaneously constrains the steering wheel as it locks the gear shift lever in position.

BRIEF DESCRIPTION OF THE DRAWINGS

FIG. 5 is an applied view showing the gear shift lever lock of FIG. 2 fastened to the console box of an automatic shifting car to lock the gear shift lever thereof;

DETAILED DESCRIPTION OF THE PREFERRED EMBODIMENTS

Figure 1:
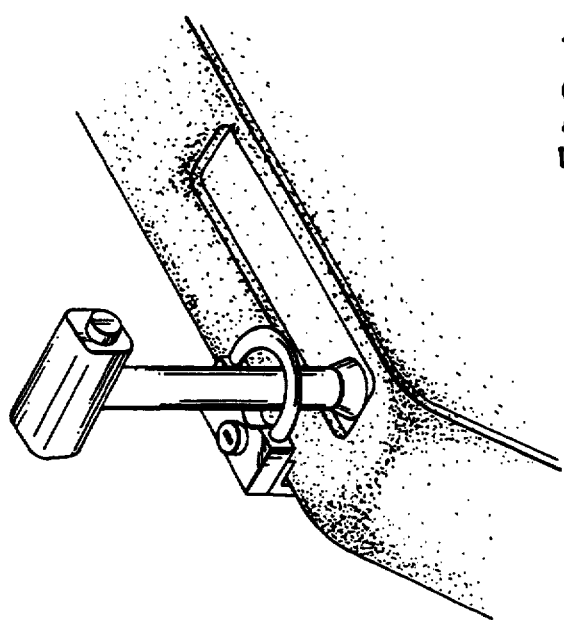
FIG. 1 shows a gear shift lever locked by a prior art gear shift lever lock.
Figure 2:
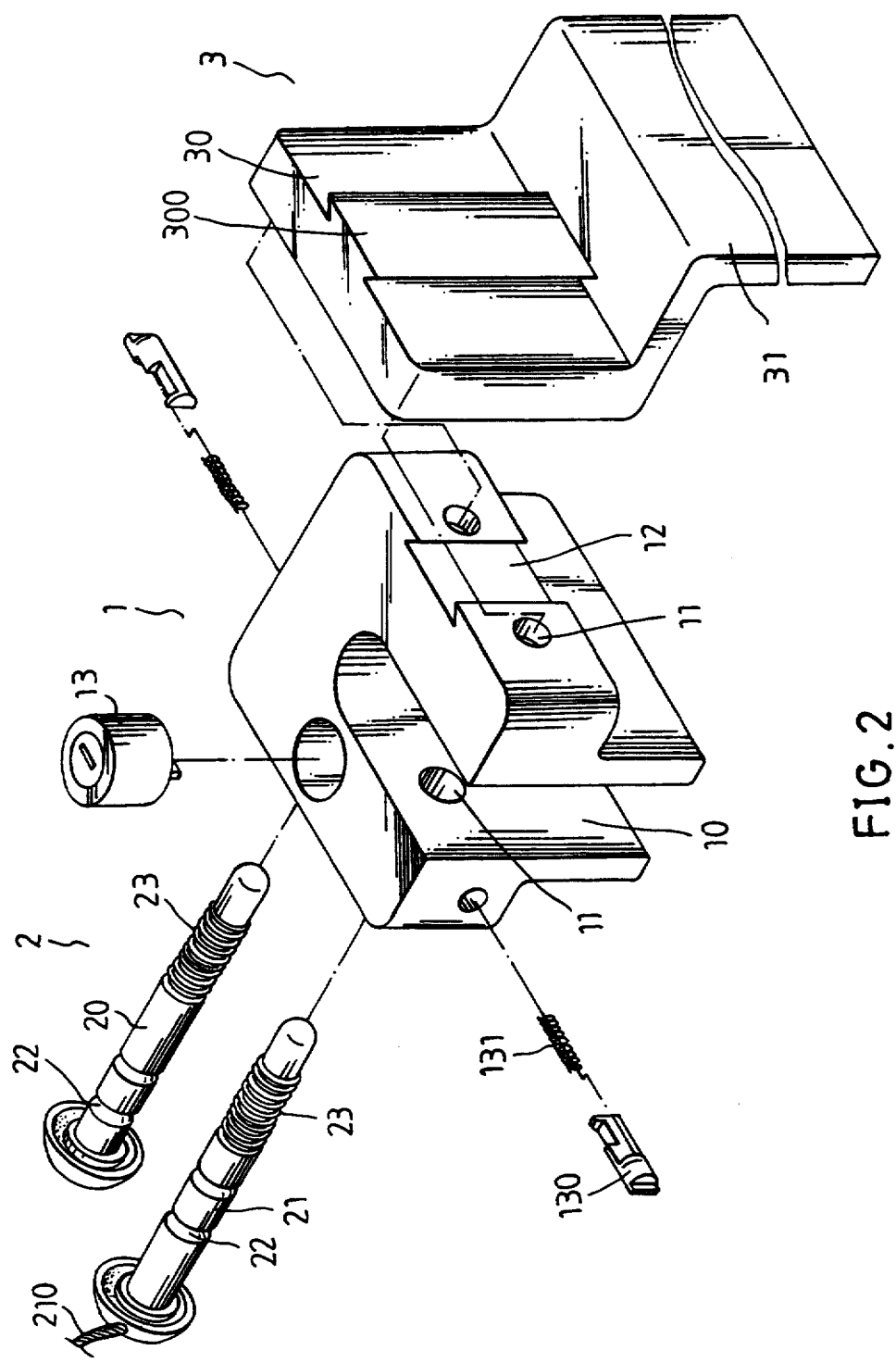
FIG. 2 is an exploded view of a gear shift lever lock according to the present invention.

Referring to FIG. 2, a gear shift lever lock in accordance with the present invention is generally comprised of a lock body 1, two headed lock bolts 2, and a mounting plate 3.

Referring to FIG. 2 again, the lock body 1 is made in a substantially T-shaped configuration when viewed from the front side, comprising a front opening 10, which receives the gear shift lever, two horizontal through holes 11 through two opposite side faces thereof, through which the two lock bolts 2 insert, a dovetail groove 12 vertically disposed on one side face thereof in the middle, a lock cylinder 13 fastened in a top hole thereof, and two latches 130 supported on respective springs 131 disposed on two opposite sides by the lock cylinder 13 and driven by the lock cylinder 13 with the key to move inwards in releasing the lock bolts 2.

Figure 4:
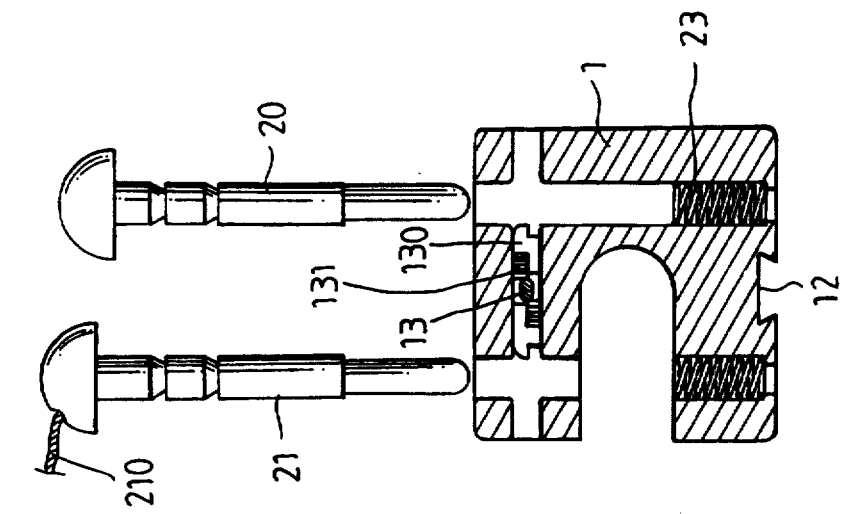
FIG. 4 is another sectional side view of the gear shift lever lock of FIG. 2 (unlocked)
Figure 3:
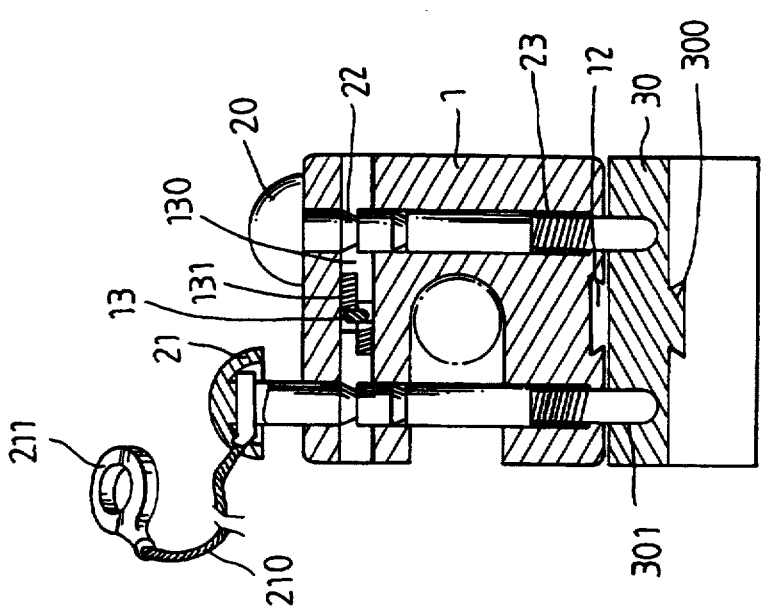
FIG. 3 is a sectional side view of the gear shift lever lock of FIG. 2 (locked)

Referring to FIGS. 3 and 4, and FIG. 2 again, the two headed lock bolts 2 are symmetrical. One headed lock bolt, namely, the first headed lock bolt 20 is used simply for fastening the lock body 1 to the mounting plate 3. The other headed lock bolt, namely, the second headed lock bolt 21 is connected with a steel rope 210 terminated to a retainer ring 211. Each headed lock bolt 20;21 comprises at least one annular groove 22 around the respective bolt body and a spring 23 mounted around the respective bolt body hear the respective tip. As the headed lock bolt 20 or 21 is inserted into the respective horizontal through hole 11, the respective latch 130 is formed by the respective spring 131 to engage into the annular groove 22 to lock the headed lock bolt 20 or 21 in position.

The mounting plate 3 is made in a stepped configuration having two opposite ends formed into two vertical walls, namely, the top vertical wall 30 and the bottom vertical wall 31 joined by a horizontal wall. The top vertical wall 30 comprises a dovetail tongue 300 on one side which fits into the dovetail groove 12 on the lock body 1, and two spaced blind holes 301 on an opposite side into which the lock bolts 20;21 insert respectively.

Figure 6:
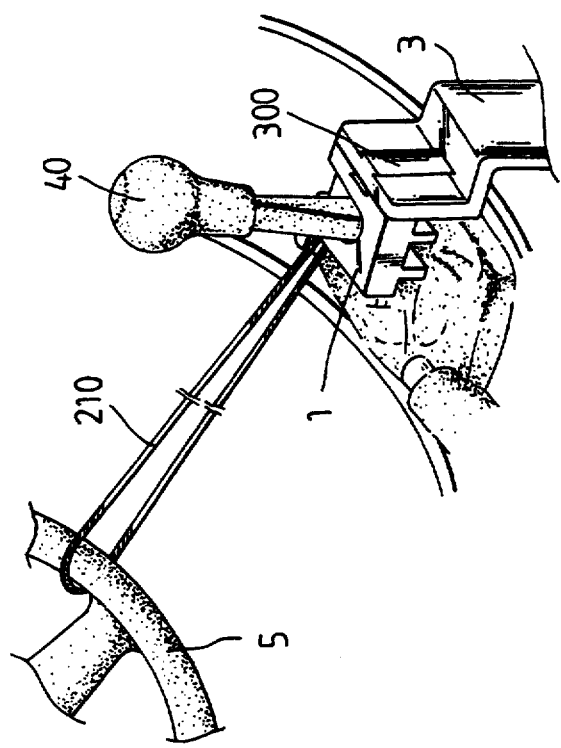
FIG. 6 is another applied view showing the gear shift lever lock of FIG. 2 fastened to the console box of a hand shifting car to lock the gear shift lever thereof.

Referring to FIGS. 3, 5, and 6, the mounting plate 3 is fastened to the console box 4 with the bottom vertical wall 31 attached to one side of the console box 4 and the top vertical wall 30 supported on the top wall of the console box 4. When in use, the lock body 1 is attached to the mounting plate 3 at one side for permitting the gear shift lever 40 to be held within the front opening 10, then the steep rope 210 is inserted through the steering wheel 5 with the retainer ring 211 mounted on the bolt body of the second headed lock bolt 21, and then the first and second headed lock bolts 20;21 are respectively inserted into through holes 11 and the blind holes 301. Therefore, the lock body 1 becomes firmly retained to the mounting plate 3 to hold the gear shift lever 40 in position, and at the same time, the steering wheel 5 is constrained by the steel rope 210. As the lock body 1 is supported on the top wall of the console box 4 to hold the gear shift lever 40 within the front opening 10 thereof, the gear shift lever 40 is protected.

Figure 7:
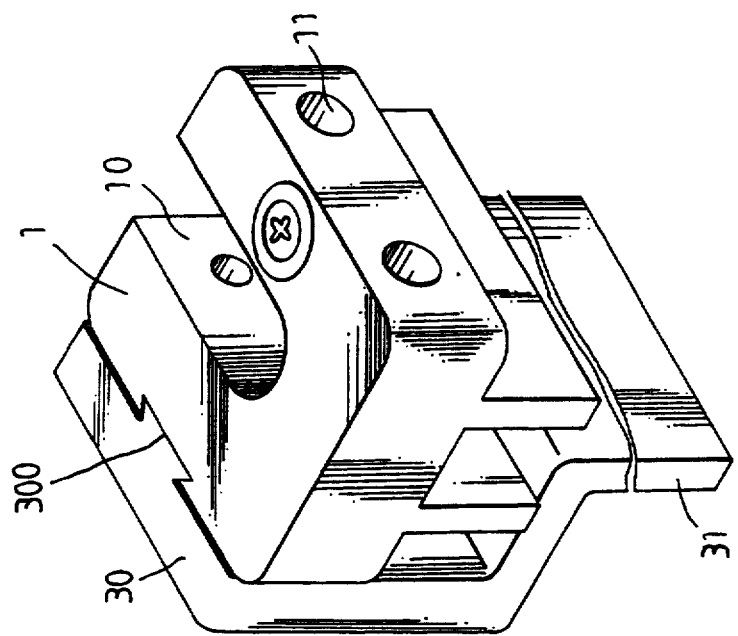
FIG. 7 is a perspective view showing the lock body of the gear shift lever lock of FIG. 2 fastened to the mounting plate thereof (when the lock is not in use)

Referring to FIG. 7, as the gear shift lever lock is not in use, the lock body 1 can be attached to the mounting plate 1 at an opposite side by engaging the dovetail groove 12 with the dovetail tongue 300.

Figure 8:
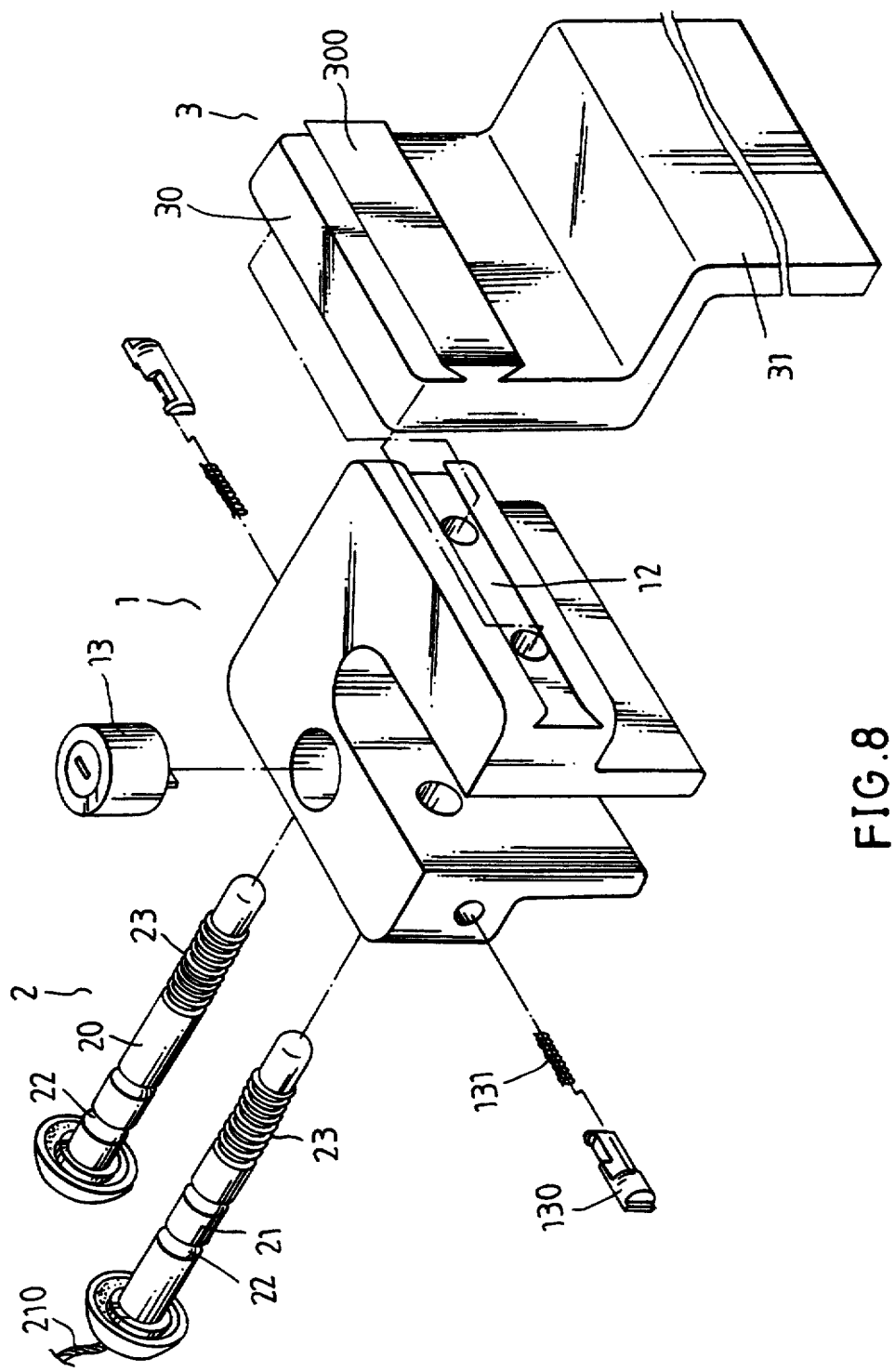
FIG. 8 is an exploded view of an alternate form of the present invention.
Figure 10:
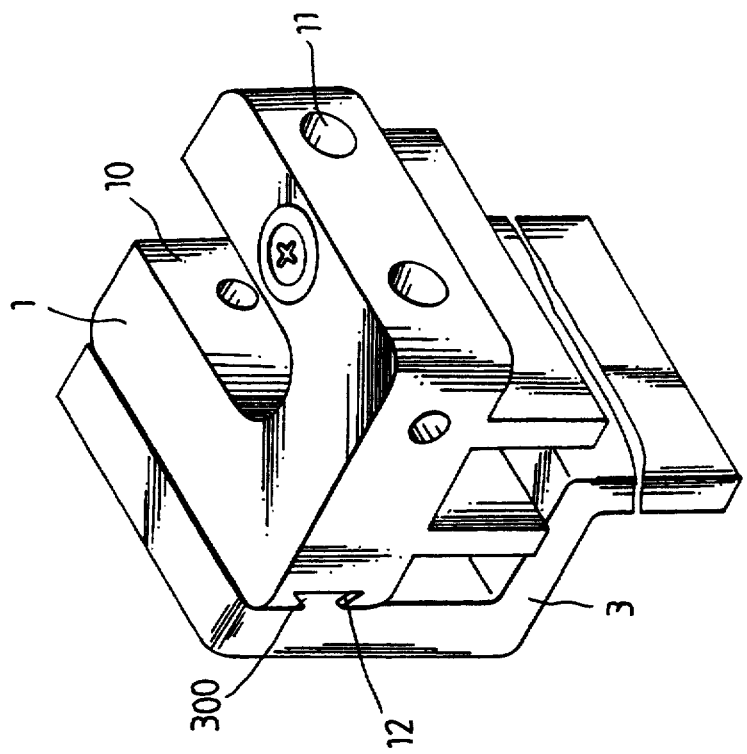
FIG. 10 is a perspective view showing the lock body of the gear shift lever lock of FIG. 8 fastened to the mounting plate thereof (when the lock is not in use).
Figure 9:
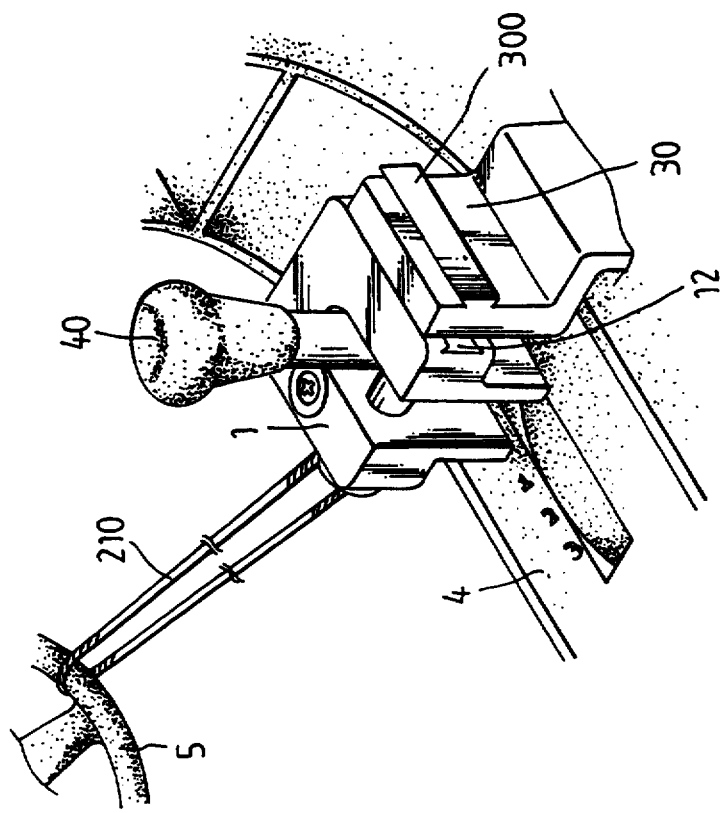
FIG. 9 is an applied view shown the gear shift lever lock of FIG. 8 fastened to the console box to lock the gear shift lever.

Referring to FIGS. 8, 9, and 10, therein illustrated is an alternate form of the present invention. In this alternate form, the dovetail groove 12 and the dovetail tongue 300 are respectively made in horizontal.

While only few embodiments of the present invention have been shown and described, it will be understood that various modifications and changes could be made without departing from the spirit and scope of the invention.

I claim:

1. A gear shift lever lock comprising: a mounting plate fixed to a console box of an automobile at one side by a gear shift lever of said automobile, two headed lock bolts, a lock body fastened to said mounting plate and locked by said headed lock bolts to constrain said gear shift lever, wherein said mounting plate is made in a stepped configuration comprises of a top vertical wall, a bottom vertical wall, and a intermediate horizontal wall joined between said top vertical wall and said bottom vertical wall, said top vertical wall comprising a dovetail tongue on one side thereof and two spaced blind holes on an opposite side thereof; said lock body comprises a front opening, which receives said gear shift lever, two horizontal through holes into which said headed lock bolts insert respectively, a dovetail groove on one side face thereof for engaging said dovetail tongue as said lock body is unlocked and not in use, a lock cylinder, two spring supported latches controlled by said lock cylinder to lock said headed lock bolts in said horizontal through holes; said lock bolts are respectively inserted into said horizontal through holes and engaged into said blind holes and locked in place by said spring supported latches, each headed lock bolt having an annular groove around the respective periphery into which either spring supported latch engages, one headed lock bolt comprising a steel rope connected to the head and terminated to a retainer ring for constraining the steering wheel of said automobile.

2. The gear shift lever lock of claim 1 wherein said lock body surrounds said gear shift lever to protect said gear shift lever against damage as said gear shift lever is constrained within said front opening of said lock body.

* * * * *